Patented June 10, 1947

2,421,971

UNITED STATES PATENT OFFICE 2,421,971

HYDROLYZED VINYL ESTER INTERPOLYMERS

Carleton Angelo Sperati, North Arlington, N. J., assignor to E. I. du Pont de Nemours & Company, Wilmington, Del., a corporation of Delaware No Drawing. Application November 6, 1944,
Serial No. 562,271

6 Claims. (Cl. 260—86)

This invention relates to polymeric alcohols and more particularly to polymeric alcohols derived by hydrolysis from olefin/vinyl organic ester interpolymers.

This invention has as an object the provision of polymeric hydroxylated interpolymers which are soluble in lower aliphatic alcohols and insoluble in liquid hydrocarbons. Additional objects will become apparent from an examination of the following description and claims.

These and other objects and advantages are accomplished according to the herein described invention which broadly comprises a hydrolyzed interpolymer of a terminally ethylenically unsaturated monoolefinic hydrocarbon containing from 3 to 5 carbon atoms with a vinyl ester of a monocarboxylic acid having the general formula RCOOH, wherein R is of the group consisting of hydrogen atoms and hydrocarbon radicals, said acid being free from unsaturated linkages between acyclic carbon atoms and any carbon atom alpha to the carbon atom in the carboxyl group of said acid being attached to at least one but not more than three carbon atoms, said interpolymer prior to hydrolysis having contained from 2% to 25% by weight of said monoolefinic hydrocarbon.

A preferred embodiment of this invention comprises a substantially completely hydrolyzed interpolymer of propylene or isobutylene with vinyl acetate, said interpolymer prior to hydrolysis having contained from 3% to 15% by weight of the monoolefinic hydrocarbon.

The following examples, in which proportions are in parts by weight unless otherwise specified, are given for illustrative purposes and are not intended to place any restrictions on the herein described invention.

Example I

A vinyl acetate/isobutylene interpolymer was prepared by heating a mixture consisting of 77.5 parts of vinyl acetate, 22.5 parts of isobutylene and 1 part of benzoyl peroxide at 60° C. in a pressure vessel for 112 hours. Upon release of the pressure, the interpolymer which was obtained was a soft, spongy mass containing small amounts of unreacted isobutylene. After removal of the unreacted isobutylene, the product was found to contain about 15% of combined isobutylene and was obtained in an overall yield of 92%.

To a solution of 90 parts of the above polymer in 400 parts of methanol there was added a solution of 40 parts of methanol containing 4.5 parts of potassium hydroxide. After a reaction period of 26 hours at 60° C., the solution was poured into an excess of cold water and a coagulum of hydrolyzed product obtained. This was washed while milling on a rubber mill to remove soluble salts and the polymeric product was removed from the rubber mill as a partially dried sheet. This substantially completely hydrolyzed isobutylene/vinyl acetate interpolymer was further dried in vacuum.

The above isobutylene-modified polyvinyl alcohol was found to be readily soluble in methanol but insoluble in acetone and water, although the polymer became soft when treated with hot water. Clear brilliant films with light surface tack were obtained upon casting from methanol or ethanol solutions. Films likewise were prepared by pressing the polymer under 500–1000 lbs./sq. in. at a temperature of 140–150° C. Films prepared by either method were found to be virtually impermeable to gasoline even if the gasoline contained appreciable quantities of aromatic hydrocarbons. For example, a film 0.0038" in thickness showed a gasoline permeability of only 0.00027 oz./sq. ft. during a 24 hour period.

Example II

An aqueous solution which consisted of the following was prepared: 150 parts of water, 0.6 part of ammonium persulfate, 0.12 part of sodium bisulfite, 0.5 part of sodium dihydrogen phosphate monohydrate, 2 parts of a dispersing agent containing 30% of the sodium salt of a sulfonated white oil. The above solution was adjusted to a pH of 6.6 by the addition of a small amount of a dilute sodium hydroxide solution. After placing this solution in a pressure vessel, 50.6 parts of vinyl acetate and 8.9 parts of propylene were added and the resulting dispersion agitated at 60° C. for 16 hours. The dispersion was removed from the pressure vessel, steamed and the interpolymer isolated by coagulation with an aluminum sulfate solution followed by filtration and washing the polymer to remove any soluble salts. There was obtained 50 parts of dry polymer (84% of theoretical) which contained approximately 5% of propylene.

To a solution of 160 parts of methanol containing 1.5 parts of potassium hydroxide heated at reflux, there was added dropwise over 2 hours a solution containing 30 parts of the above propylene/vinyl acetate interpolymer and 280 parts of methanol. The resulting hydrolyzed product separated from the solution as a gummy material which was hardened by the addition of acetone. The product was then washed thoroughly with acetone to remove soluble impurities and dried. The propylene-modified polyvinyl alcohol was soluble in an approximately 1:1 water/methanol mixture. Films obtained by casting from the water-methanol solution were rubbery and very pliable with a high tear strength.

The interpolymers which are subjected to hydrolysis to provide the novel products of this invention may be had by interpolymerization of a monoolefinic hydrocarbon as hereinbefore defined with a vinyl ester of a monocarboxylic acid as previously set out, by bulk, solution, emulsion, or granular polymerization techniques. It is preferred to carry out the interpolymerization with agitation and under pressure to prevent loss of the more volatile hydrocarbons.

The hydrolysis of said interpolymers may be effected by any of the usual methods such as acid, or alkali catalyzed alcoholysis, hydrolysis with water in the presence of catalysts used for splitting fats (e. g., acids, Twichell reagents, metal oxides and the like), or saponification with alkali in water or water-alcohol mixtures. By choice of the alcohol or the solvent employed in the alkaline hydrolysis and by control of the time in the acid catalyzed alcohols, it is possible to prepare partially hydrolyzed interpolymers. However, interpolymers which are substantially completely hydrolyzed have markedly superior properties, so that I prefer, in the hydrolysis operation, to permit said hydrolysis to proceed substantially to completion.

As hereinbefore stated, the novel products of this invention are hydrolyzed interpolymers of a terminally ethylenically unsaturated monoolefinic hydrocarbon containing from 3 to 5 carbon atoms with a vinyl ester of a monocarboxylic acid having the general formula RCOOH, wherein R is of the group consisting of hydrogen atoms and hydrocarbon radicals, said acid being free from unsaturated linkages between acyclic carbon atoms and any carbon atom alpha to the carbon atom in the carboxyl group of said acid being attached to at least one but not more than three carbon atoms, said interpolymer prior to hydrolysis having contained from 2% to 25% by weight of said monoolefinic hydrocarbon.

Included among examples of vinyl esters which may be reacted with the unsaturated monoolefinic hydrocarbon as hereinbefore defined to provide interpolymers which upon hydrolysis yield my novel products are: vinyl formate, vinyl acetate, vinyl benzoate, vinyl butyrate, vinyl stearate, vinyl propionate, vinyl cyclohexanoate, vinyl isobutyrate, vinyl palmitate, vinyl myristate, vinyl toluate, vinyl naphthylate, and the like. However, on account of the superior products had therewith I prefer to employ an interpolymer of an unsaturated monoolefinic hydrocarbon as hereinbefore defined with a vinyl ester of an organic acid having the general formula $C_nH_{2n+1}COOH$, wherein $n$ is a positive integer within the range of from 1 to 3. Inasmuch as the acid group of the vinyl ester is removed by hydrolysis, it is usually most economical to employ a polymer in which the vinyl organic ester is vinyl acetate, since vinyl acetate is the most readily available vinyl organic ester.

The terminally unsaturated monoolefinic hydrocarbons, adapted for use in the preparation of the interpolymers which upon hydrolysis yield the novel products of this invention, must contain not less than 3 carbon atoms and not more than 5 carbon atoms. When said monoolefinic hydrocarbon contains less than 3 carbon atoms, the resultant hydrolyzed interpolymer is insoluble in lower aliphatic alcohols; while when said monoolefinic hydrocarbon contains more than 5 carbon atoms, interpolymerization of the hydrocarbon with the vinyl organic ester can be effected only with the greatest difficulty, if at all. Included among examples of terminally unsaturated monoolefinic hydrocarbons adapted for use in the preparation of the hydrolyzed interpolymers of this invention are: propylene, butene-1, isobutylene, isopentene and the like. Because of the ease of interpolymerization and the superior properties of the resulting product had therewith, the preferred monoolefinic hydrocarbons are propylene and isobutylene.

Appreciable effects are had when the interpolymer subjected to hydrolysis contains as little as 2% and as much as 25% by weight of terminally unsaturated monoolefinic hydrocarbon. However, superior products are obtained when the monoolefinic hydrocarbon content of said interpolymer is within the range of from 3% to 15% by weight.

The hydrolyzed products of this invention are soluble in the lower alcohols or aqueous alcoholic solutions and are insoluble in liquid aliphatic hydrocarbon. Thus they may be used in the preparation of hydrocarbon resistant linings. These hydrolyzed interpolymers differ from the hydrolyzed ethylene/vinyl organic ester interpolymers in that the latter are insoluble in the lower aliphatic alcohols.

The hydrolyzed olefin/vinyl organic ester interpolymers of this invention react with aromatic or aliphatic sulfonyl chlorides to produce the corresponding polysulfonates of the polyalcohol. The sulfonates can be used as alkylating agents for amines. Ethers can be formed from the hydrolyzed olefin/vinyl ester interpolymers with sodium chloroacetate. They may be subjected to other reactions such as conversion to sulfates by treatment with chlorosulfonic acid, or into acetals by reaction with aldehydes, or into xanthates to give water soluble products.

The hydrolyzed olefin/vinyl organic ester interpolymers of this invention may be used in the preparation of films, molded objects, coatings, photographic gelatin substances, pellicles, and the like.

As many apparently widely different embodiments of this invention may be made without departing from the spirit and scope thereof, it is to be understood that I do not limit myself to the specific embodiments thereof except as defined in the appended claims.

Having described the present invention the following is claimed as new and useful:

1. A hydrolyzed interpolymer of a terminally ethylenically unsaturated monoolefinic hydrocarbon containing from 3 to 5 carbon atoms with a vinyl ester of a mono-carboxylic acid having the general formula RCOOH wherein R is of the group consisting of hydrogen atoms and hydrocarbon radicals, said acid being free from unsaturated linkages between acyclic carbon atoms and any carbon atom alpha to the carbon atom in the carboxyl group of said acid being attached to at least one but not more than three carbon atoms, said interpolymer prior to hydrolysis having contained from 2% to 25% by weight of said monoolefinic hydrocarbon.

2. The product as set forth in claim 1, wherein the vinyl ester is vinyl acetate.

3. A hydrolyzed interpolymer of isobutylene with vinyl acetate, said interpolymer prior to hydrolysis having contained from 3% to 15% by weight of said isobutylene.

4. A hydrolyzed interpolymer of propylene with vinyl acetate, said interpolymer prior to hydrolysis having contained from 3% to 15% by weight of said propylene.

5. A substantially completely hydrolyzed interpolymer of isobutylene with vinyl acetate, said interpolymer prior to hydrolysis having contained from 3% to 15% by weight of said isobutylene.

6. A substantially completely hydrolyzed interpolymer of propylene with vinyl acetate, said interpolymer prior to hydrolysis having contained from 3% to 15% by weight of said propylene.

CARLETON ANGELO SPERATI.

REFERENCES CITED

The following references are of record in the file of this patent:

UNITED STATES PATENTS

| Number | Name | Date |
| --- | --- | --- |
| 2,213,423 | Wiezevich | Sept. 3, 1940 |
| 2,200,429 | Perrin et al. | May 14, 1940 |

FOREIGN PATENTS

| Number | Country | Date |
| --- | --- | --- |
| 650,038 | Germany | Sept. 9, 1937 |
| 477,885 | Great Britain | Jan. 7, 1938 |